(12) United States Patent
Park et al.

(10) Patent No.: US 6,882,794 B1
(45) Date of Patent: Apr. 19, 2005

(54) RECORDING MEDIUM STORING ADDITIONAL INFORMATION FOR RESTORING DIGITAL DATA STREAM/INFORMATION, RECORDING METHOD AND RESTORING METHOD

(75) Inventors: Sung-wook Park, Seoul (KR);
Seong-jin Moon, Seoul (KR);
Young-nam Oh, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1071 days.

(21) Appl. No.: 09/695,197

(22) Filed: Oct. 25, 2000

(30) Foreign Application Priority Data

Oct. 27, 1999 (KR) .............................................. 99-46903

(51) Int. Cl.[7] .............................. H04N 5/85; H04N 7/26; H04N 5/91
(52) U.S. Cl. ........................... 386/125; 386/109; 386/46
(58) Field of Search ................................... 386/109, 111, 386/112, 27, 33, 124, 125, 126, 40, 45, 68, 69, 70, 81, 82, 46; H04N 5/85, 7/26, 5/91

(56) References Cited

U.S. PATENT DOCUMENTS 6,408,338 B1 * 6/2002 Moon et al. ................. 709/231
6,470,135 B1 * 10/2002 Kim et al. ..................... 386/68
6,789,072 B1 * 9/2004 Kim et al. ..................... 707/3

FOREIGN PATENT DOCUMENTS

JP          10-3778       1/1998
JP        2000-339929    12/2000

* cited by examiner

Primary Examiner—Robert Chevalier
(74) Attorney, Agent, or Firm—Stein, McEwen & Bui, LLP

(57) ABSTRACT

A recording medium which stores additional information for restoring digital data streams, and a recording method and a restoration method therefor. The restoration method includes determining the scope of unification of data streams which were divided by editing/re-recording and are to be restored, after checking whether or not the divided data streams can be unified with other data streams, according to additional information which indicates that a divided data stream was combined with another data stream before division; and updating additional information on a plurality of data streams in the determined unification scope so that the additional information corresponds to one data stream which corresponds to the determined unification scope. Accordingly, divided data streams can be restored to an original state which existed before editing/re-recording.

35 Claims, 8 Drawing Sheets

RECORDING MEDIUM STORING ADDITIONAL INFORMATION FOR RESTORING DIGITAL DATA STREAM/ INFORMATION, RECORDING METHOD AND RESTORING METHOD

CROSS-REFERENCE TO RELATED APPLICATIONS

This application claims the benefit of Korean Application No. 99-46903, filed Oct. 27, 1999 in the Korean Patent Office, the disclosure of which is incorporated herein by reference.

BACKGROUND OF THE INVENTION

1. Field of the Invention

The present invention relates to recording, editing, and reproducing, and more particularly, to a recording medium which stores additional information required in restoring data streams, which are divided by editing/re-recording, to their original state, and a recording method and a restoration method therefor.

2. Description of the Related Art

When data is recorded on a recordable medium, in most cases search data, which is used in decoding, is generated and recorded separately from user data, so that a user can freely edit and reproduce contents. When a user edits/re-records some recorded content, related search data changes in order to reflect details of the edited/recorded-again content.

Conventionally, the search data does not provide a method and/or information for restoring the changed search data to the original state when editing is canceled. Therefore, when information which indicates whether or not an editing function was performed is not recorded, changed search data cannot be restored, particularly in the case of a removable recording medium. This is a problem of the conventional art.

The above relationship between a data stream and search data in a digital versatile disc (DVD) video recorder, to which the above described restoration method is applied, is shown in FIG. 1. FIG. 1 shows a relationship between a data stream, which is recorded on the recording medium, and search data, which is used in managing recorded data streams, which is referred to as Program Cell Information (PGCI). A DVD recorder encodes an input analog image and records the analog image in the form of a digital data stream. Here, one analog image is recorded in the form of a video object (VOB) on the recording medium, and one video object is divided into video object units (VOBUs). A VOBU is a unit for management. A VOBU is data which is recorded from the time when a user begins recording to the time when the user finishes recording, and is recorded in units of a volume of an episode or a movie.

When a user searches for an image in a recording medium in order to replay recorded images, the user searches for data which is recorded in units of programs, because a program is the most widely used unit. When a user records a certain program, the user recognizes the existence of only one program. Internally, however, there exists a cell, which provides meaningful information to users, and video object information (which is referred to as VOBI, VOB Information, or linking information), which actually links cell information (also referred to as search information) to video objects. In the DVD field, cell information or VOBI are called navigation data. Navigation data means data which is used for handling VOBs easily and in various ways, but cannot be seen during actual reproduction.

Cell information includes a lot of information on VOBs, and among it, the starting time of a cell and the ending time of a cell are representative. A cell shown in FIG. 1 includes cell information.

In addition, VOB information includes a lot of information on VOBs, including time MAP (TMAP), which is information on a VOB unit, temporary erase (TE) flag, which indicates whether or not a related VOB is temporarily deleted, the starting time of a VOB, and the ending time of a VOB. For reference, the TMAP in FIG. 2 shows only VOBU playback time (VOBU_PB_TM) among specifications for a DVD video recorder.

In the meantime, an editing function which divides a data stream in a DVD video recorder and restores it later corresponds to temporary deletion. An example of a data stream which is divided by temporary deletion is shown in FIG. 2.

When part of a program is deleted in a DVD video recorder, a cell, VOB information, and a VOB are each divided into two parts. One part is to be temporarily deleted, and the other part is to remain. The TE flag in VOBI for a VOB corresponding to the part to be temporarily deleted is set at "ON" (i.e. changed from TE_OFF to TE_ON). Hatch lined parts indicate temporarily deleted parts. Data in the temporarily deleted parts are not actually deleted, instead, only navigation data are separated from the parts to show deletion effects.

When reproduction is performed, the part without hatch lines, that is 0~x on the time axis of FIG. 2, is reproduced, and then, after the part with hatch lines is skipped, the part without hatch lines starting from y is reproduced. Here, among VOBs newly generated by temporary deletion, VOBs (VOB1 and VOB3 in FIG. 2) which include partially deleted VOBUs (VOBU1 and VOBU3 in FIG. 2) must be considered. Generally, the starting time of a cell, the ending time of a cell, the starting time of a VOB, and the ending time of a VOB can become different, as shown in FIG. 2, when editing is performed. A cell processes an image in units of a picture, which is shown to a user, while a VOB is processed in units of VOBU, which is a sub-unit of a VOB. An image shown to a user is formed by pictures, each of which is displayed on a screen for $\frac{1}{30}$ second, or $\frac{1}{60}$ second, while a VOBU is processed in units of group of picture (GOP) of moving picture experts group (MPEG). In such cases, restoration of a VOB which is temporarily erased causes a problem.

FIG. 3 illustrates an example of restoring a VOB, which is temporarily deleted, using a simple restoration method. In existing DVD video recorders, the simple restoration method in which the TE flag of a VOBI, which is temporarily deleted, is switched from "ON" to "OFF", is used.

That is, there is a promise in a conventional method that, when a program is temporarily deleted, it is represented by a TE flag. Therefore, when part of a program is temporarily deleted, the existing VOB of the program is divided so that temporarily deleted cells, VOBs, and VOBI are separated from the remaining cells, VOBs and VOBI, and the TE flag in the VOBIs of the temporarily deleted VOBs are set at "ON" in preparation for later restoration. However, since only the TE flag has information on temporary deletion, there is no other way than setting the TE flag to "OFF" when restoring later.

In such a case, as shown in FIG. 2, the second VOB (VOB2) can be restored and reproduced, but temporarily deleted parts included in the first VOB (VOB1) and the third VOB (VOB3), which include partially deleted VOBUs (VOBU1, VOBU3), are not restored. So, it is impossible to restore all data to the way it was before temporary deletion.

Therefore, when the previous simple restoration method is used, the restored program may have two or more cells, VOBs, and VOBI. This means that restoration of temporarily deleted parts after temporary deletion does not result in the original program as shown in FIG. 1. Since restoration after temporary deletion means restoration to the original state from a user's point of view, a method for fully restoring cells, VOBs, and VOBI that are divided by temporary deletion is needed.

SUMMARY OF THE INVENTION

To solve the above problems it is an object of the present invention to provide a recording medium which stores additional information for restoring data streams which are divided into a plurality of pieces, such as can occur as a result of managing and editing of recorded contents, to their original state.

It is another object to provide a recording medium which stores contiguity information (CTI) for restoring data streams, which are divided into a plurality of pieces during temporary deletion, to their original state.

It is another object to provide a method of recording additional information for restoring data streams, which are recorded on a recording medium and are divided during editing/re-recording, to their original state.

It is another object to provide a method of restoring data streams which are divided into a plurality of pieces, such as can occur as a result of managing and editing of recorded contents, to their original state.

It is another object to provide a method of restoring data streams which are divided into a plurality of pieces during temporary deletion, to their original state.

Additional objects and advantages of the invention will be set forth in part in the description which follows, and, in part, will be obvious from the description, or may be learned by practice of the invention.

To accomplish the above objects of the present invention, there is provided a recording medium having a manufacturer information field, a search information field which stores search information for searching through a plurality of data streams, and a linking information field which stores linking information for linking search information to actual data streams, in which additional information, which indicates that divided data streams were one data stream before being divided by editing/re-recording, is stored in one of a manufacturer information field, the search information field, and the linking information field.

To accomplish the above and other objects of the present invention, there is provided a method of editing/re-recording recorded data streams on a recording medium having a manufacturer information field, a search information field which stores search information for searching through a plurality of data streams, and a linking information field which stores linking information for linking search information to actual data streams, the recording method including recording additional information, which indicates that divided data streams were one data stream before being divided by editing/re-recording, on one of the manufacturer information field, the search information field, and the linking information field.

To accomplish the above and other objects of the present invention, there is provided a method of restoring data streams divided by editing/re-recording to their original state, the method including determining the scope of unification of a data stream which was divided by editing/re-recording and is to be restored, after checking whether the divided data stream can be unified with another data stream, according to additional information which indicates that the divided data stream was combined with the other data stream before division; and updating additional information related to the data stream in the determined unification scope.

BRIEF DESCRIPTION OF THE DRAWINGS

The above objectives and advantages of the present invention will become more apparent by describing in detail an embodiment thereof with reference to the attached drawings in which.

DESCRIPTION OF THE PREFERRED EMBODIMENTS

Figure 1:
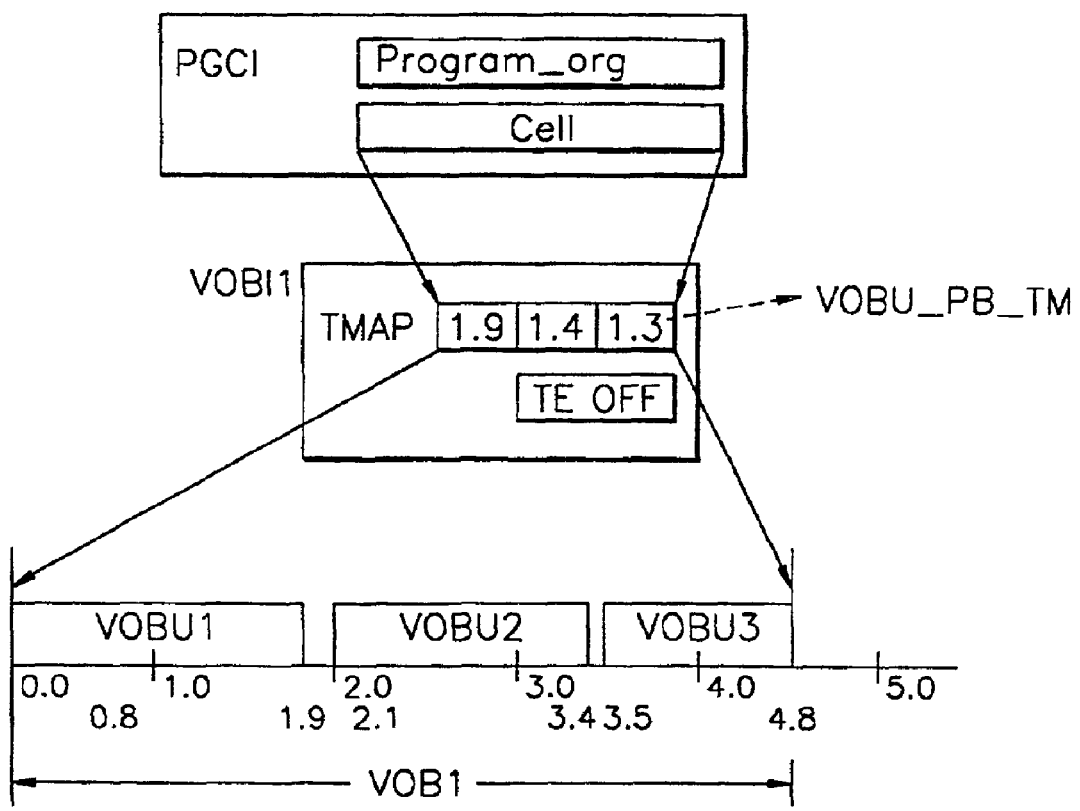
FIG. 1 illustrates the relationship between search information and a data stream in prior art.
Figure 2:
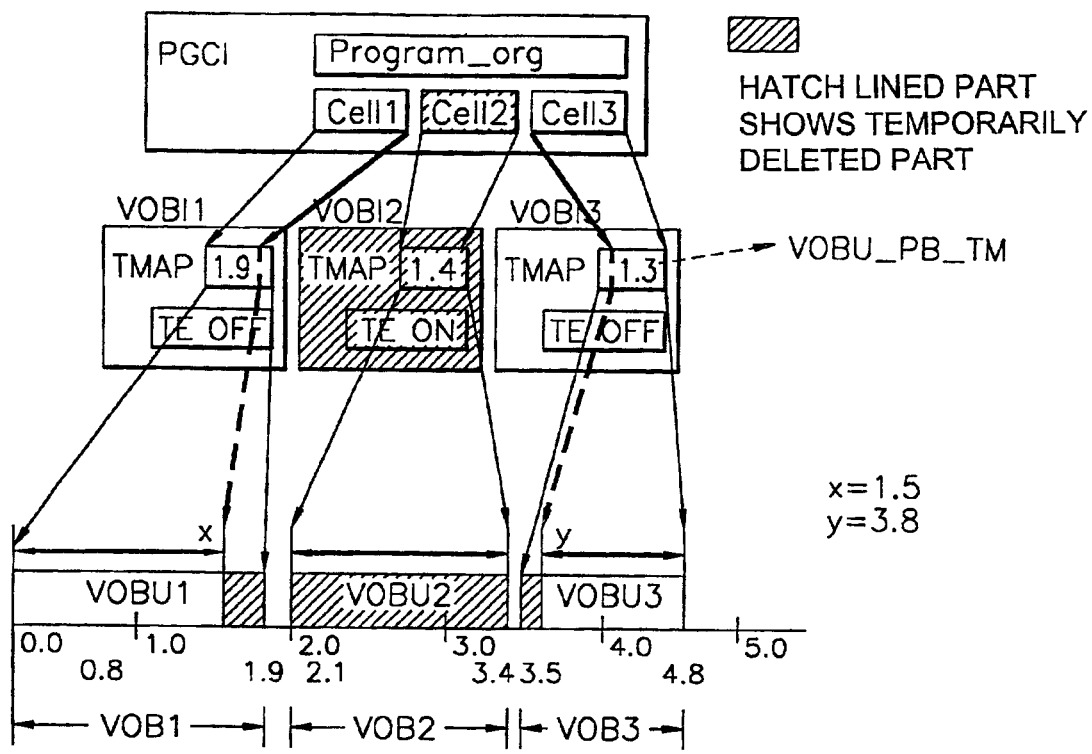
FIG. 2 illustrates an example of a data stream, which is conventionally divided by temporary deletion.
Figure 3:
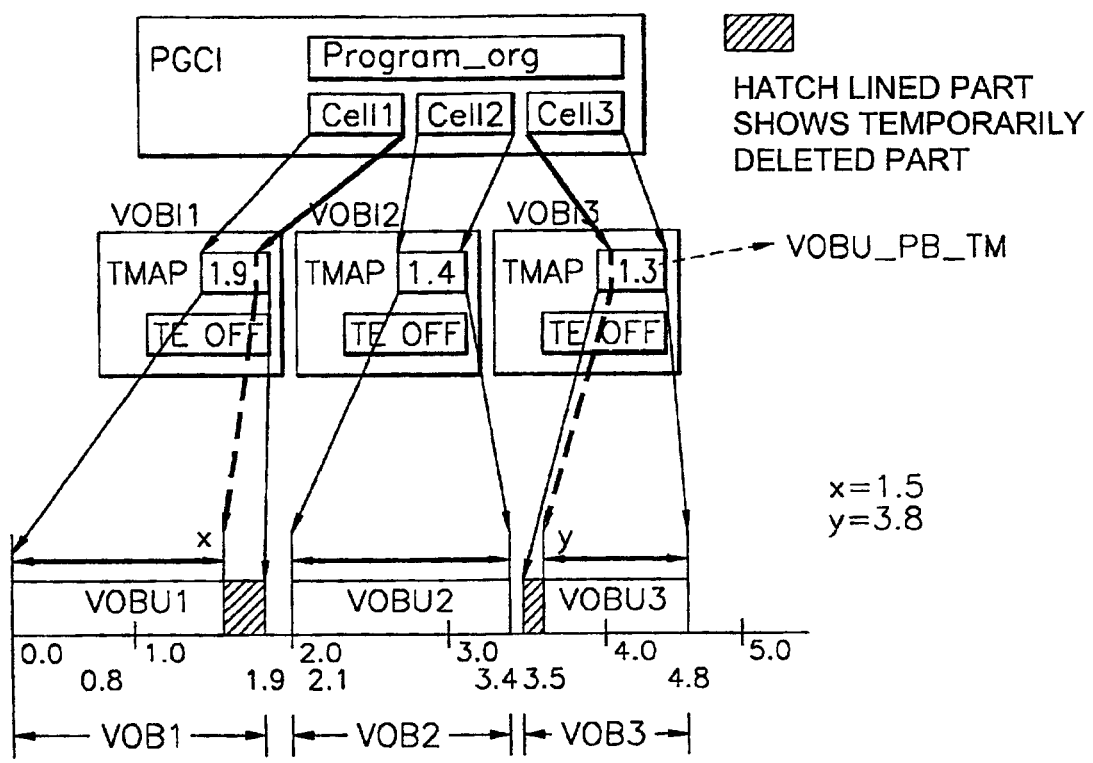
FIG. 3 illustrates an example of conventionally restoring a data stream, which is divided by temporary deletion, using a simple restoration method.

Reference will now be made in detail to the present preferred embodiments of the present invention, examples of which are illustrated in the accompanying drawings, wherein like reference numerals refer to like elements throughout.

In solving the above problems, according to the present invention, additional information, which signifies that divided data streams were one data stream before division so that they then can be unified, if editing is canceled when a recorded data stream is divided into a plurality of pieces, is stored. When this additional information is set during a process of dividing a data stream, a recording/editing system can determine the possibility of unifying, referring to this additional information, even when a removable recording medium is used. In the present invention, this additional information is referred to as contiguity information (CTI).

When there is no CTI that indicates the contiguity of divided data streams, it is impossible to unify divided data streams and restore them to the original state before division. That is, it cannot be determined whether or not neighboring data streams can be unified by using only the TE flag, when data streams are divided. Therefore, it is essential to have information, which indicates whether or not neighboring data streams would have been continuously reproduced before division, in order to fully restore the original state.

A restoration method using this additional information can be also applied to a case where an editing object is not content data but system data, for example, search data. That is, if the other information changes by editing search data, when other information that is affected by search data exists, the other information can be restored later using CTI.

Figure 4:
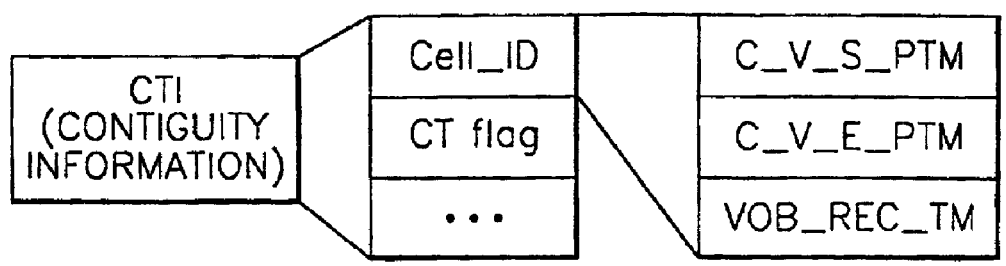
FIG. 4 illustrates an example of the structure of additional information for restoring a digital data stream according to the present invention.

FIG. 4 is an example of the structure of CTI, that is, additional information for restoring a digital data stream according to the present invention. CTI, which indicates that data streams divided by editing were originally one data stream, is formed by Cell_ID (cell identification), which is information showing each divided data stream, and a CT flag (contiguity flag). Cell_ID is thus named because data streams recorded/edited in a DVD video recorder are managed in units of cells. Cell_ID uses the starting time of a cell (C_V_S_PTM), the ending time of a cell (C_V_E_PTM), and VOB recording time (VOB_REC_TM) in order to uniquely present data recorded/edited in a DVD video recorder. Among these three elements, all three, any two, any one, or none may be used. When none are used, the original state of recorded/edited data is estimated by using the relative location of CTI.

A CT flag means that a cell indicated by Cell_ID formed one cell together with another cell before division. Here, another cell can be any cell, but, for illustration, it is assumed to be a preceding cell. Also, when a cell is divided into a plurality of cells, a CT flag can mean that the plurality of cells were originally one cell.

Figure 5:
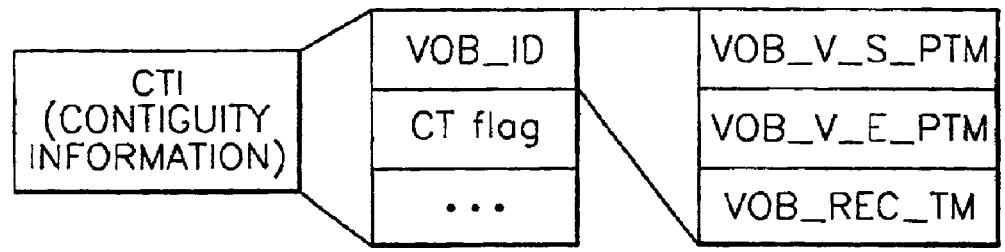
FIG. 5 is another example of the structure of additional information for restoring a digital data stream according to the present invention.

FIG. 5 illustrates another example of the structure of CTI, that is, additional information for restoring a digital data stream according to the present invention. CTI, which indicates that data streams divided by editing were originally one stream of data, is formed of VOB_ID (cell identification), which is information showing divided data streams, and a CT flag. VOB_ID is thus named because data streams recorded/edited in a DVD video recorder are managed in units of VOB. For reference, in a DVD video recorder, a cell (an original cell, in particular) and a VOB match one to one. VOB_ID uses the starting time of a VOB (VOB_V_S_PTM), the ending time of a VOB (VOB_V_E_PTM), and a VOB recording time (VOB_REC_TM) in order to uniquely present data recorded/edited in a DVD video recorder. Among these three elements, all three, any two, any one, or none may be used. When none are used, the original state of recorded/edited data is estimated by using the relative location of CTI.

A CT flag means that a cell indicated by VOB_ID formed one VOB together with another VOB before division. Here, another VOB can be any VOB, but, for illustration, it is assumed to be a preceding VOB.

Figure 6:
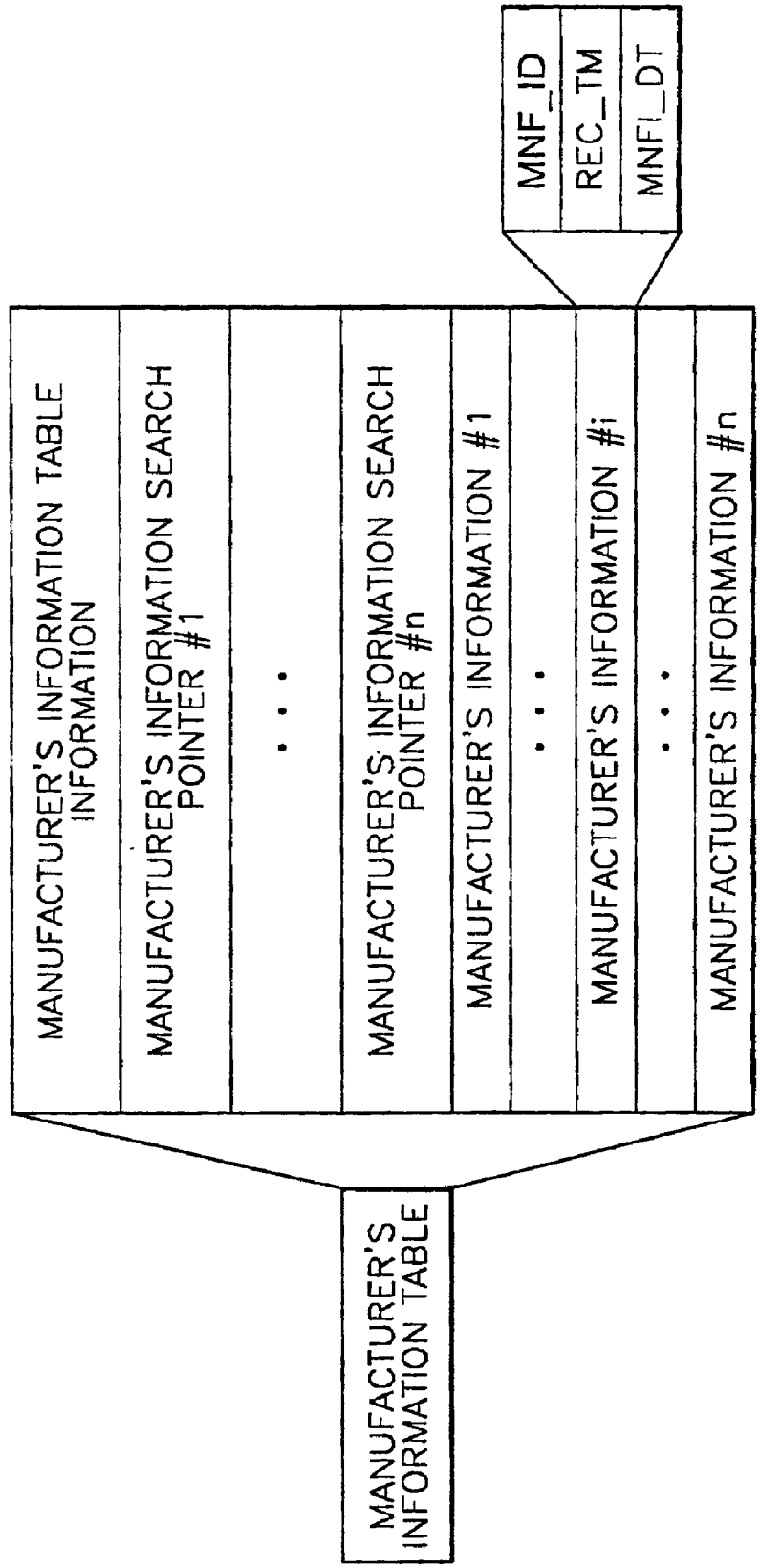
FIG. 6 illustrates the location where additional information exists on a digital versatile disc (DVD) video recorder to which the present invention is applied.

FIG. 6 illustrates an example of the location, where CTI having one of the information structures shown in FIGS. 4 and 5 and proposed in the present invention exists, in navigation data of a DVD video recording. Although navigation data of a DVD video recording is not an industry standard, the data supports a manufacturer's information table which can be used by each manufacturer in adding a function. A manufacturer can record manufacturer's information on a predetermined field identified by manufacturer identification information (MNF_ID). Referring to FIG. 6, the predetermined field is a manufacturer's information data (MNFI_DT) field. That is, CTI is recorded in the manufacturer's information data field.

Here, additional information shown in FIG. 4 or 5 can be stored in the manufacturer's information field, or the additional information shown in FIG. 4 can be stored in a cell information field, while the additional information shown in FIG. 5 can be stored in a VOBI field.

Figure 7:
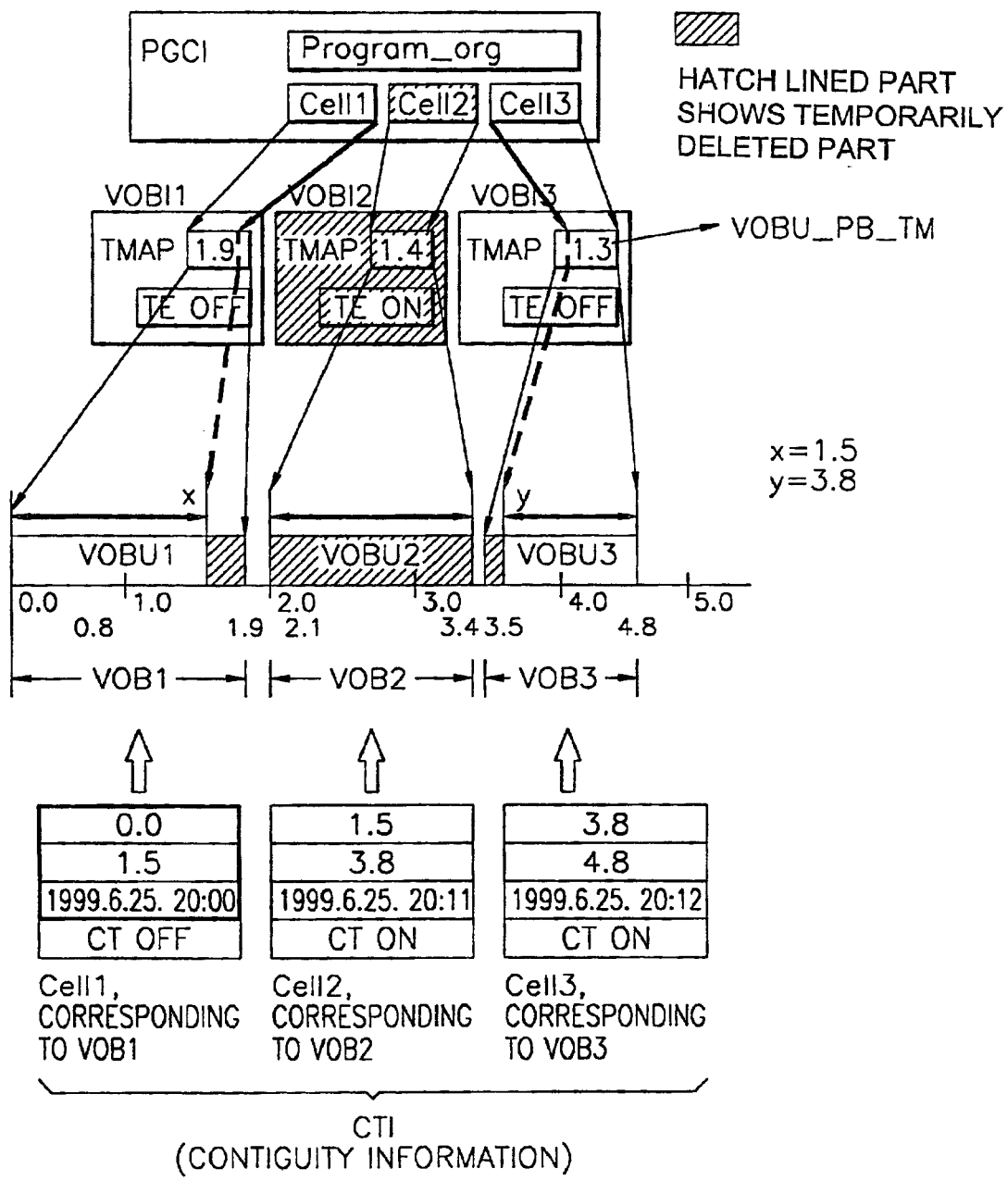
FIG. 7 is an example of a data stream which is divided by temporary deletion.

FIG. 7 illustrates examples of CTI for data streams, which are divided by temporary deletion, when the CTI has the information structure shown in FIG. 4. The first CTI indicates its relation to a first cell (Cell1) and a first VOB (VOB1) by using the starting time of a cell, the ending time of a cell, and the recording time of a VOB. Since the CT flag is "OFF", it is indicated that the preceding cell and the current cell were not one cell before division. The second CTI indicates its relation to a second cell (Cell2) and a second VOB (VOB2) by using the starting time of a cell, the ending time of a cell, and the recording time of a VOB. Since the CT flag is "ON", it is indicated that the preceding cell, which is Cell1, and the current cell were one cell before division. The third CTI indicates its relation to a third cell (Cell3) and a third VOB (VOB3) by using the starting time of a cell, the ending time of a cell, and the recording time of a VOB. Since the CT flag is "ON", it is indicated that the preceding cell, which is Cell2, and the current cell were one cell before division.

Figure 8:
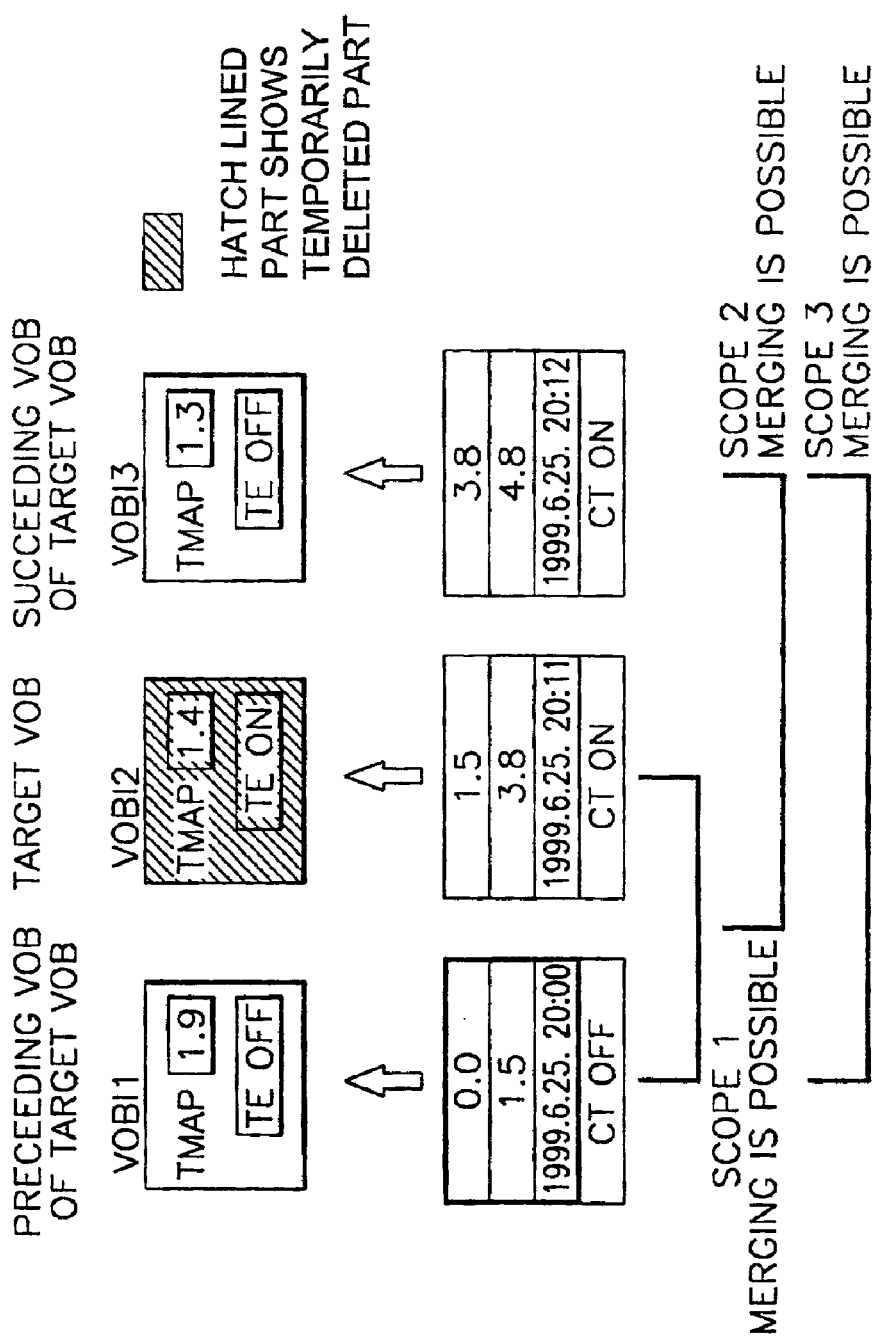
FIG. 8 illustrates an example of a method of determining the scope of unification for combining a data stream which is divided by temporary deletion.

FIG. 8 illustrates an example of a method of determining the scope of unification required for restoring the original data stream when a cell, VOBI, and a VOB are divided and corresponding CTIs are generated, respectively, by temporary deletion, as shown in FIG. 7. When divided information is restored, what information can be unified must be checked first.

When VOB2 was temporarily deleted and is to be restored, it is restored as according to the following.

CTI information related to VOB2 is referenced. When the CT flag related to VOB2 is "ON", VOB2 and the preceding VOB, which is VOB1, can be unified. For reference, when a CT flag is "OFF", it is impossible to unify a corresponding VOB with its preceding VOB.

Next, CTI information related to VOB3 is referenced. When the CT flag related to VOB3 is "ON", VOB3 and the preceding VOB, which is VOB2, can be unified. Here, however, VOB3 must not be in a temporarily deleted state. For reference, when VOB3 is in a temporarily deleted state or the CT flag is "OFF", it is impossible to unify it with another VOB. Therefore, VOB1 and VOB2 can be unified, and VOB2 and VOB3 can be unified. So, VOB1, VOB2, and VOB3 can be unified.

Figure 9:
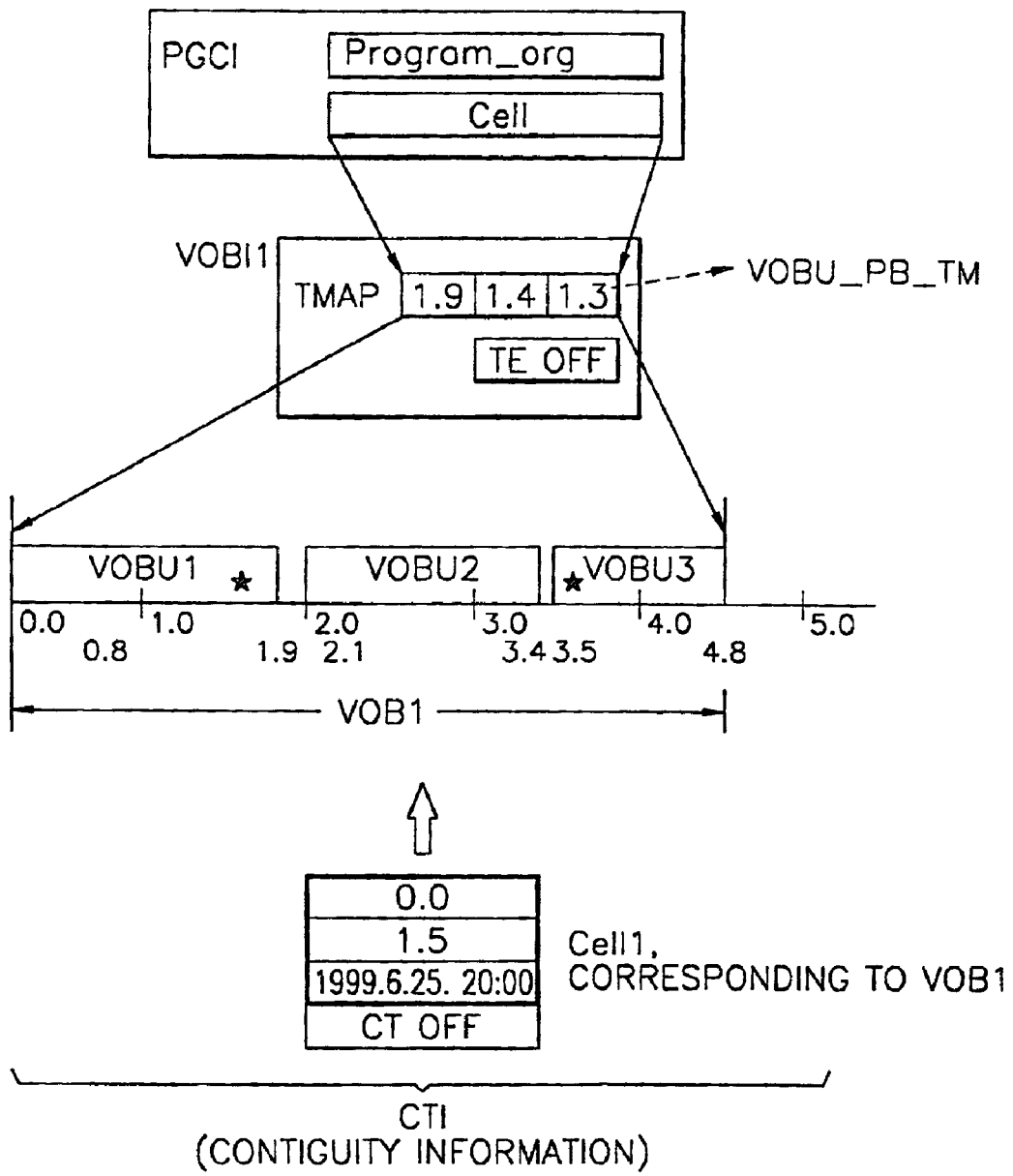
FIG. 9 illustrates an example of restoring a divided data stream by using additional information according to the present invention.

FIG. 9 illustrates an example of restoring a divided data stream by using CTI proposed by the present invention. FIG. 9 shows the result of restoration of a divided data stream, when it is determined that VOB1, VOB2, and VOB3 can be unified, through the process shown in FIG. 8. First, navigation data corresponding to VOB1, VOB2, and VOB3 are unified. Of course, modification of navigation following the unification must be performed. That is, the CTI is updated by the starting time of a cell, the ending time of cell, and the recording time of a VOB, which corresponds to the first cell, Cell1, and the first VOB, VOB1. When unification is performed this way, video data, which corresponds to the parts marked by ★, can be also reproduced when a program is reproduced.

As described above, the present invention provides a method of generating additional information, CTI, when a data stream is divided by an editing function such as temporary deletion. When the proposed information structure and method of setting the scope of unification are used, data streams which were divided by temporary deletion can be fully restored to their original state.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording medium comprising:
   a plurality of data streams including at least a first data stream and a second data stream;
   a manufacturer information field;
   a search information field which stores search information for searching through the plurality of data streams;
   a linking information field which stores linking information for linking search information to at least one of the plurality of data streams; and
   additional information which indicates that the first data stream and the second data stream comprised a third data stream before being divided by editing/re-recording, wherein said recorded information is stored in one of the manufacturer information field, the search information field and the linking information field.

2. The recording medium of claim 1, wherein the manufacturer information field further comprises a manufacturer information data field, wherein the additional information is stored.

3. The recording medium of claim 1, wherein the additional information includes a contiguity (CT) flag which indicates that the first and second data streams were the third data stream before division.

4. The recording medium of claim 1, wherein the additional information includes first information which names each of the first and second data streams, and second information which indicates that the first and second data streams were the third data stream before division.

5. The recording medium of claim 4, wherein the first information is included in one of the search information field and the linking information field, and indicates that the second information is provided for the first and second data streams.

6. The recording medium of claim 4, wherein the first information includes at least one of a recording time, a starting time, and an ending time of each of the first and second data streams about which more information is provided as the second information.

7. The recording medium of claim 4, wherein the first information includes at least one of a recording time, a starting time, and an ending time of a cell which includes the first and second data streams about which more information is provided as the second information.

8. The recording medium of claim 4, wherein the first information includes at least one of a recording time, a starting time, and an ending time of a VOB which includes the first and second data streams about which more information is provided as the second information.

9. The recording medium of claim 4, wherein the second information indicates that the first and second data streams indicated by the first information were combined as one data stream before division.

10. The recording medium of claim 4, wherein the second information indicates that the first data stream indicated by the first information preceded the second data stream and was combined with the second data stream before division.

11. The recording medium of claim 4, wherein the second information indicates that the first and second data streams were the third data stream before being divided into the first and second data streams.

12. A method of editing/re-recording recorded data streams on a recording medium having a manufacturer information field, a search information field which stores search information for searching through a plurality of data streams, and a linking information field which stores linking information for linking the search information to at least one of the plurality of data streams, the recording method comprising:
    dividing at least one data stream into a plurality data streams;
    recording additional information, which indicates that each of the plurality of divided data streams was a part of the one data stream before being divided by editing/re-recording, on one of the manufacturer information field, the search information field and the linking information field.

13. The method of claim 12, further comprising storing the additional information in a manufacturer information data field in the manufacturer information field.

14. The method of claim 12, further comprising:
    naming each divided data stream;
    storing each name as first information; and
    storing second information which indicates that each divided data stream was a part of the one data stream before division.

15. The method of claim 14, further comprising:
    storing the first information in one of the search information field and the linking information field, the first information indicating data streams about which more information is provided as the second information.

16. The method of claim 14, further comprising:
    including at least one of a recording time, a starting time and an ending time of divided data streams in the first information.

17. The method of claim 14, further comprising:
    including at least one of a recording time, a starting time of a cell and an ending time of a cell of divided data streams in the first information.

18. The method of claim 14, further comprising:
    including at least one of a recording time, a starting time of a video object (VOB) and an ending time of a VOB of the divided data streams in the first information.

19. The method of claim 14, further comprising:
    indicating in the second information that the divided data streams indicated by the first information were combined as the one data stream before division.

20. The method of claim 14, further comprising:
    indicating in the second information that one of the divided data streams indicated by the first information was combined with a preceding data stream before division.

21. The method of claim 14, further comprising:
    indicating in the second information that the plurality of data streams were the one data stream before being divided into the plurality of data streams.

22. A method of restoring data streams divided by editing/re-recording to their original state, the method comprising:
    determining data streams to be included in a scope of unification by checking whether each of a plurality of divided data streams is unifiable with another of the plurality of data streams, according to additional information which indicates that each divided data stream was combined with another of the plurality of divided data streams before division; and updating additional information related to each divided data stream in the determined unification scope.

23. The method of claim 22, further comprising:

nullifying information which indicates that each divided data stream included in the unification scope was a part of one data stream before division, the information included in the additional information related to each data stream included in the unification scope.

24. The method of claim 22, further comprising:

updating a recording time, a starting time, and an ending time information for each divided data stream included in the unification scope in the additional information.

25. A method of restoring data streams on a recording medium which were divided by editing/re-recording to their original state, the method comprising:

checking contiguity information relating to a first data stream, the contiguity information having been recorded at the time of editing/re-recording;

determining if the contiguity information indicates that the first data stream followed and was combined with the second data stream before being divided; and updating the contiguity information so that the first data stream again follows the second data stream in a reproduction sequence.

26. The method of claim 25, wherein the updating of the contiguity information comprises:

updating a starting time of the first data stream;

updating an ending time of the first data stream; and updating a recording time of the first data stream.

27. The method of claim 26, wherein the checking of contiguity information includes checking that a flag associated with the first data stream is set to an ON condition and that a similar flag associated with the second data stream is set to an OFF condition.

28. A method of editing/re-recording a data stream on a recording medium to enable restoration the data stream to an original state, the method comprising:

dividing the data stream into first and second divided data streams;

recording contiguity information relating to each of the first and second divided data streams, the contiguity data indicating that the first data stream followed and was combined with the second data stream before being divided; and storing the contiguity information in a predetermined recording area of the recording medium.

29. The method of claim 28, wherein the storing of contiguity information further comprises:

providing a contiguity information ON/OFF flag for each of the first and second data streams;

changing the ON/OFF flag associated with the first data stream to an ON condition when contiguity information is stored.

30. The method of claim 28, wherein the storing of the contiguity information comprises:

storing a starting time of the first data stream;

storing an ending time of the first data stream; and storing a recording time of the first data stream.

31. A recording medium comprising:

a first data stream;

a second data stream;

a contiguity data set stored in a predetermined recording area of the recording medium, the contiguity data set comprising:

a name which identifies each of the first and second data streams;

a contiguity flag which indicates that the first data stream and the second data stream comprised a third data stream before being divided by editing/re-recording; and contiguity information relating to each of the first and second data streams from which the first and second data streams can be restored into the third data stream.

32. The recording medium as claimed in claim 31, wherein the contiguity information for each of the first and second data streams comprises:

a starting time of the respective data stream;

an ending time of the respective data stream; and a recording time of the respective data stream.

33. The recording medium as claimed in claim 31, wherein the third data stream is one of a video object (VOB), a video object unit (VOBU), and a cell.

34. The recording medium as claimed in claim 31 wherein the predetermined recording area is identified by a first field in a manufacturer's information table.

35. The recording medium as claimed in claim 34 wherein the contiguity information is stored a manufacturer's information data field (MNFI_DT) field which is identified by the first field.

* * * * *